United States Patent [19]

Wolf et al.

[11] Patent Number: 4,566,604
[45] Date of Patent: Jan. 28, 1986

[54] METAL CLOSING DISK AND A PROCESS

[76] Inventors: Franz J. Wolf, Sprudelallee 19, 6483 Bad Soden-Salmünster; Rudolf Klaschka, Tannenweg 9, 7896 Wutöschingen, both of Fed. Rep. of Germany

[21] Appl. No.: 561,162

[22] Filed: Dec. 14, 1983

[30] Foreign Application Priority Data

Dec. 17, 1983 [DE] Fed. Rep. of Germany ....... 3246890

[51] Int. Cl.$^4$ .............................................. H01G 9/10
[52] U.S. Cl. ..................................... 220/68; 220/378; 220/DIG. 27
[58] Field of Search .......... 220/68, 215, 378, DIG. 27

[56] References Cited

U.S. PATENT DOCUMENTS

| 2,011,890 | 8/1935 | Boessenkool | 220/DIG. 27 |
| 2,144,959 | 1/1939 | Blackburn | 220/DIG. 27 |
| 2,447,493 | 8/1948 | Daniel | 220/378 X |
| 3,232,473 | 2/1966 | Dillon | 220/378 X |

FOREIGN PATENT DOCUMENTS 0065021 11/1982 European Pat. Off. .
2718228 10/1978 Fed. Rep. of Germany .

Primary Examiner—Steven M. Pollard
Attorney, Agent, or Firm—Webb, Burden, Robinson & Webb

[57] ABSTRACT

The invention relates to a metal closing disk with an essentially bar-shaped metal elevation of smaller diameter and with an insulating layer applied at least to the elevation surface side of the closing disk and consisting of a plastic or elastomer, especially for closing electrolytic can-type capacitors, and also to a process for improving the seal in closing disks of this type. Since it has been possible for an electrolyte to creep between the insulating layer and the underside of the closing disk in known closing disks provided with an insulating layer at least on the inner face and intended for electrolytic can-type capacitors, thus resulting in reforming actions and changes in capacitance, the object of the invention is to prevent this. Consequently, in a closing disk according to the invention, the insulating layer is made to adjoin flush the base region of the metal elevation formed on, so that the complete surface of the underside of the closing disk is consequently covered. Furthermore, there is in the base region of the elevation a flange-like projection which is brought into press-sealing contact with the insulating layer, for example as result of axial upsetting of material.

14 Claims, 3 Drawing Figures

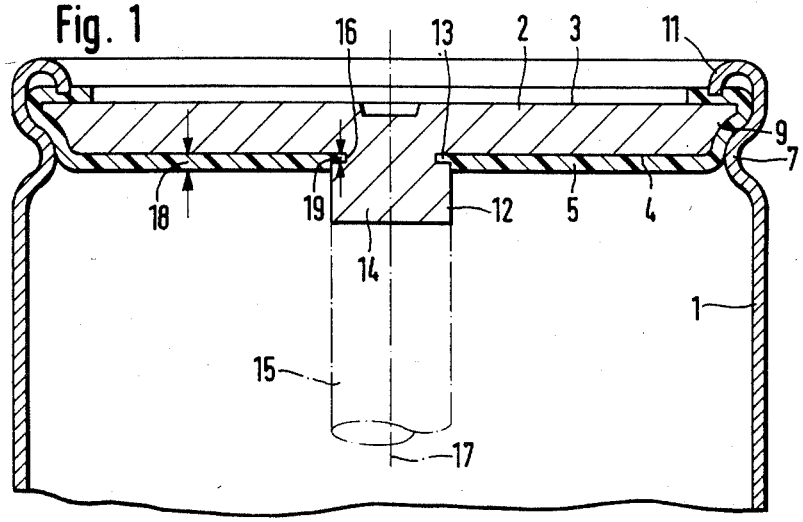
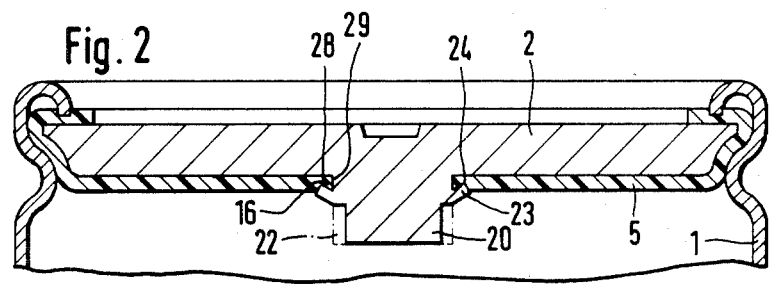
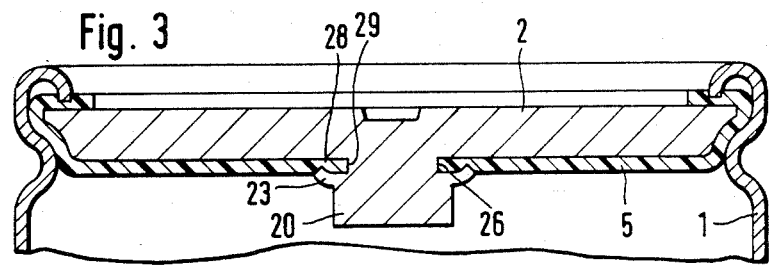

METAL CLOSING DISK AND A PROCESS

BACKGROUND

Description

The invention relates to a metal closing disk and to a process for producing this closing disk or for improving the seal between the surface of a metal disk and an insulating layer applied to it.

A metal closing disk of the relevant type, also intended particularly for can-type capacitors, is known from DE No. 2,718,228 A1. However, the main feature of this known closing disk for can-type capacitors is that the closing disk itself is designed in construction terms so that as a mass-produced article it can be provided automatically with an insulating layer, above all in the region of the disk edge.

In this known design of the closing disk, the aspect of achieving as good and constant electrical data as possible in an electrolytic can-type capacitor provided with this closing disk still requires improvement. It has been shown, in particular, that when, for example, an elastomer compound is injection-molded round the disk edge it is still always possible for electrolytic substances, here especially liquid electrolytes, to penetrate between the elastomer layer and the underside or elevation surface side of the closing disk. This process occurs when only an outer radial edge region of the elevation surface side of the closing disk is covered by the insulating layer, but also when the insulating layer extends completely up to the bar-shaped metal elevation which in the known closing disk is designed as a centering or winding spindle.

The reason for the change in electrical characteristics, here especially the capacitance of the appropriate finished electrolytic can-type capacitor, is that, when a least the surfaces of the closing disk including the metal elevation, which point into the capacitor can, are preformed, postforming caused by the electrolyte takes place when the capacitor is put into operation. It is assumed here, of course, that the closing disk forms the positive pole of the capacitor, which is electrically insulated from the can housing, which serves as a negative pole, by means of the insulation of the closing disk in the edge region.

Whereas the postforming of the surface of the known closing disk, this surface being as it were exposed relative to the can interior of the capacitor, can take place so to speak by the application of voltage or when the capacitor is put into operation, the elastomer layer, for example vulcanized on the elevation surface side, prevents postforming taking place parallel to the other regions. The surface boundary layer, pointing into the can housing, of the closing disk, including the metal bar-shaped elevation, is consequently partially postformed and partially only preformed. The resulting different forming layers represent, when the capacitor is in operation, potential differences, slight though they may be, which cause residual currents and tracking currents as fault currents. This problem becomes even more serious when the inner surface of the closing disk is not preformed at all and when gradual postforming takes place on the surface not covered by the elastomer. The capacitances of electrolytic can-type capacitors are greatly influenced by these fault sources, so that sometimes not even the tolerance values are maintained or relatively large tolerance ranges have to be specified for the capacitance. However, in both cases, there are serious disadvantages, so that efforts are being made to eliminate these defects.

European Patent Application EP No. 0,065,021 A1 also discloses a metal closing disk which is designed as a composite cover disk, the main aim of this application being to allow several electrical ducts to be guided, electrically insulated, through the closing disk and, furthermore, to integrate an excess-pressure safety valve in this closing disk. As can be seen particularly in the Figures, the metal closing disk is likewise designed with an elastomer layer surrounding its edge and extending onto the underside. At a slight distance from this elastomer layer and possibly even adjoining it, a plastic layer is provided on the underside. In a similar way to the known closing disk mentioned above, this adjoining region between the plastic and elastomer layers on the underside allows the electrolyte to penetrate into this boundary layer during operation and gradual forming of at least the underside of the cover disk to occur. As a result, even in this cover disk, the disadvantages described above, especially that of a change in capacitance, can arise.

The object of the invention is, therefore, to design a closing disk of the relevant type, which it must be possible to produce economically as a mass-produced article, in such a way that a reliable seal against substances in the can interior, especially against an electrolyte, is achieved between the insulating layer and the underside of the closing disk in the region of the bar-shaped elevation, and this will result in additional fixing of the insulating layer and must be possible essentially without further devices even when the closing disk is in one piece with the bar-shaped elevation, the object also being to provide an appropriate process for this.

As regards the process, the object is achieved by means of the features of the characterizing clause of claim 11.

SUMMARY OF THE INVENTION

The essential idea of the invention is, in a closing disk provided in one piece with a peg-like or bar-shaped elevation on the surface pointing into the housing interior, first to apply the insulating layer directly flush up to the peg-like elevation. If an annular groove merging into the elevation surface side, that is to say the underside of the closing disk pointing towards the can interior, is present at the base of the peg-like elevation, the insulating layer is also introduced into this annular groove positively and/or non-positively. As a result of upsetting the material of the peg-like elevation in an axial direction towards the actual closing disk, the elevation, here particularly the annular surface obtained as result of the annular groove, comes into press contact with the insulating layer. Because of this, the insulating layer is pressed down annularly against the elevation surface side of the metal disk, so that at least in this region a reliable seal is also provided against the penetration of an electrolyte.

Depending on the material used, a press-force component acting radially in the direction of the axis of rotation of the closing disk can be produced, for example, when a disk-like prefabricated plastic molding is attached or snapped into the annular groove. This press force acting in a radial direction as result of the expansion of material in the annular groove is obtained because the coaxial recess provided in the prefabricated plastic molding is designed with a somewhat smaller diameter than the smallest outside diameter of the base of the annular groove.

In addition to this radially acting sealing-force component, the insulating layer undergoes, in the region of the outer edge of the peg-like elevation, axial pressing against the underside or elevation surface side of the closing disk. In the case mentioned above, therefore, double sealing against the penetration of a substance, especially a liquid electrolyte, from the interior of a capacitor can is achieved between the insulating layer and the underside of the closing disk.

As an alternative to the formation of an annular groove in the base region of the peg-like elevation, but also in addition to this, a radially outer layer of the elevation can be pared off in the base region, so that an annular chip contiguous with the elevation is pared off in the base region, and this is connected relatively rigidly in material terms to the elevation peg of slightly reduced diameter. During the operation of paring off or cutting away, a closed annulus of material, which projects essentially radially outwards from the elevation in the manner of a flange, is brought down onto the insulating layer. The chip-like curve which is usually present in addition to the radial extension and which points towards the actual closing disk engages in an edge-like manner with the surface of the insulating layer pointing towards the can interior. To generate the coaxially acting pressing force of the insulating layer against the elevation surface side of the closing disk, the operation of paring off the annular chip is usually sufficient itself. However, in addition to this, s further upsetting of material in an axial direction can also be carried out.

An essential feature of the invention is, therefore, that, in addition to the fact that the insulating layer ends flush with the peg-like elevation, there is in the base region of the elevation a flange-like projection which is provided approximately at a distance amounting to the thickness of the insulating layer to be applied from the lower surface or elevation surface of the closing disk. This flange-like projection which covers at least to some extent the radially innermost region of the insulating layer is brought down as result of upsetting of material in press-sealing contact onto the insulating layer opposite the elevation surface side of the closing disk. Although the closing disk and the corresponding process can be used in any type of closing technique in which there is the problem of preventing creeping between the insulating layer and a metal surface, the invention is intended pre-eminently for use on closing disks with a peg-like elevation which is formed in one piece on them and which can serve, for example, as a centering spindle or winding spindle. Of course, use is not restricted to peg-like elevations made in one piece, but can also extend to closing disks in which a peg-like elevation of this type is, for example, screwed in, pressed in or attached in another way before the insulating layer is applied.

As regards a closing disk for electrolytic can-type capacitors, the closing disk will preferably consist of a material with at least 99% aluminum. This choice is based, above all, on weight and cost factors, but of course aluminum alloys or other corrosion-resistant metals also come under consideration.

The materials used for the insulating layer of an aluminum closing disk are those which are known per se and are customary for this purpose, in particular sulfur-free cross-linked synthetic elastomers being suitable for this and preferably peroxidically cross-linked EPDM (ethylene/propylene/diene terpolymer) or butyl rubber being used.

When plastic is used as an insulating layer, especially as a prefabricated molding, it is preferable to adopt materials which are dimensionally resistant even at high temperatures, for example at temperatures in the range above 125° C.

Furthermore, these materials will not be porous and must be corrosion-resistant, that is to say, they must be completely inert towards all components and materials included in the housing to be closed. In particular, therefore, the materials must be inert towards liquid electrolytes. Consequently, plastics consisting of polyamide or glass-fiber-reinforced polyamide are preferably used for this purpose.

When the closing disk is used in a mass-production process, the closing disk, including the peg-like elevation formed in one piece on it, is made rotationally symmetrical relative to the center axis of the disk. The peg elevation, that is to say the distance between the underside or elevation surface side of the actual closing disk and the end of the elevation which when installed projects into the can housing, can differ greatly depending on the field of use. Insofar as this peg-like elevation is provided as a winding spindle, its length can, in principle, extend over almost the entire height of the can-type capacitor. In another extreme case in which essentially only the electrolytic creeping and residual currents on the closing disk are to be prevented, for example double to triple the axial extension of the axial width of the annular groove can be sufficient. A depth of the annular groove in a radial direction of approximately 1 mm or greater can be considered sufficient, when the insulating material is pressed in the annular groove as a result of upsetting the material of the peg-like elevation, to prevent radial slipping-out or predominantly a pressing of material radially outwards instead of a pressing radially inwards towards the base of the annular groove.

To produce an annular chip in addition to the existing annular groove or even on its own, it is sufficient, for example with a diameter of the peg-like elevation of 6 mm, to make the base region in which cutting away is to be carried out approximately 7 mm. That is to say, in the base region oriented towards the actual closing disk the peg-like elevation can be designed with a step of greater diameter, the annular surface of which is then preferably provided approximately perpendicularly to the axis of the closing disk. To produce the annular chip, a paring sleeve or paring ram is guided over the peg-like elevation after the insulating layer has been applied. The inside diameter of the paring sleeve is selected slightly larger than the diameter of the elevation region of narrower diameter. Consequently, where the dimensions of a 6 mm or 7 mm diameter, indicated by way of example, are concerned, a closed annular chip or annulus with a wall thickness of approximately 0.5 mm can be pared off by means of the paring sleeve in the base region of the peg-like elevation. The length, that is to say approximately the flange-like or radial extension, in which a slight chip curve must of course be taken into account, depends on the axial length of the step of larger diameter and on the cutting path of the tool.

Although for the purpose of a double pressing force and a corresponding seal the aim is to ensure that the insulating layer ends radially flush with the peripheral wall of the peg-like elevation, this being on the base of the annular groove when an annular groove is present, the insulating layer can also be provided at a slight radial distance from the peripheral wall of the peg-like elevation. However, it is necessary to ensure, in this case, that sufficient pressing of material in the insulating layer still takes place during the axial upsetting of material. Preferably, however, when there is an annular groove, the insulating layer will fill this annular groove completely and with radial clamping of material against the base of the annular groove. For this purpose, the appropriate materials, such as a plastic or an elastomer, can be snapped on either by injection-molding or as a prefabricated molding.

The flange-like projection which is pressed against the insulating layer positively and/or non-positively can be designed in its simplest form as an annular groove with a square cross-section. Although a dovetailed undercut of the annular groove, that is to say a wider annular base in comparison with the remaining groove orifice, improves the pressing of material in the annular groove, nevertheless this is more difficult to achieve in production terms. When the flange-like projection is produced by means of a cutting-away operation in which an annular chip resembling a rivet-closing head is finally pressed against the insulating layer, a further upsetting of material can likewise be carried out either without a previous annular groove or in addition to an already existing annular groove formed in the base region. The radial depth of the flange-like projection can therefore be varied depending on whether there is an annular groove present or not and depending on the axial length of the portion cut away in the base region of the elevation. In this design of a closing disk according to the invention, the simple press-sealing contact, which is provided in an axial direction and which can be supplemented by radial press-sealing contact, can be achieved in production terms without any additional particular devices on the closing disk. The material strength, even as regards aluminum and the cutting-away operation, is certainly sufficient to obtain the pressing of material relative to the underside of the closing disk and consequently to ensure that it is sealed off reliably. It may be mentioned merely as an additional point that, of course, the insulating layer extends in one piece around the radial outer edge of the closing disk, at least on to the top side of the latter, in order to obtain in the edge region an electrically insulating fluid seal as result of the beading of the can wall.

THE DRAWINGS

The invention is explained below in even more detail with reference to several diagrammatic exemplary embodiments. In the drawing:

FIG. 1 shows an axial section through the upper region of a can-type capacitor with an annular groove formed in the base region of a peg-like elevation on the closing disk;

FIG. 2 shows likewise a fragmentary axial section through a closing disk in which there is no prefabricated annular groove in the base region of the elevation, but a flange-like projection is formed by means of an annular chip, and FIG. 3 shows an axial section through a closing disk inserted into a capacitor can and beaded, with a flange-like projection as a combination of an annular groove and an annular chip.

DESCRIPTION OF THE EMBODIMENT

FIG. 1 shows in axial section a closing disk 2 which is provided in a sheet-like manner on the underside, as it were the elevation surface side 4, with an insulating layer 5. This insulating layer 5 can be provided as an elastomer, for example by means of injection-molding, on the complete underside 4 of the closing disk 2 and its radial outer edge 9 and at least partially on the top side 3. The closing disk 2, having a top side and underside essentially parallel to one another in the example according to FIG. 1, is provided at its radial outer edge 9, in the region oriented towards the interior of the can housing 1, with a continuous annular groove which has an axial section resembling a circular segment.

The can housing 1, which like the closing disk 2 consists of aluminum, has in the upper region a continuous bead 7 pointing radially inwards. When a can-type capacitor of this type is produced, the closing disk 2, round which the insulating layer 5 is injection-molded, is inserted into the upper region of the can housing 1 and thus rests on the bead 7. To guarantee sealing-off relative to the wall of the can housing, the upper edge 11 of the can housing 1 is beaded radially inwards. As a result of this beading, on the one hand the closing disk 2 is pressed axially against the bead 7 in the direction of the interior of the can housing 1, and on the other hand, by means of the upper edge 11 itself, a pressing of the material of the elastomer used for the insulating layer is exerted against the top side 3 of the closing disk 2.

The closing disk made rotationally symmetrical in relation to the axis 7 has in one piece on its underside 4 an elevation which is designed as a cylindrical peg 14. A peg 15 located further inwards in an axial direction is indicated by a broken line in FIG. 1. Functioning, for example, as a centering spindle or a winding spindle, a peg 15 of this type can extend up to the can bottom with a slight clearance relative to the latter. However, FIG. 1 shows a peg 14 which is relatively short axially and which has in the base region an annular groove 16 merging into the underside 4 of the closing disk 2. This annular groove 16 has, in axial section, approximately the form of a rectangle of equal sides.

The annular surface of the groove 16, pointing towards the underside 4 of the closing disk 2, forms a flange-like projection relative to the annular groove or to the insulating layer 5 which completely fills the annular groove 16.

After the insulating layer 5 has been applied to the underside 4, the edge region 9 and the top side 3 of the closing disk 2, the material of the peg 14 is upset in an axial direction against the actual closing disk 2, that is to say, as it were upwards in FIG. 1. This upsetting can be carried out fully automatically with relatively low application of force, for example in a press device. As a result of this upsetting of the material of the peg 14, the annular groove 16 is reduced somewhat in axial direction, that is to say the insulating material located in the annular groove 16 is pressed, both a radial and an axial pressing component occurring. Whereas the insulating layer 5 has a greater material thickness 18 outside the peg diameter, there is a reduced material thickness 19 in the region of the annular groove 16 of upset material. This upsetting of the material of the peg 14 and the resulting pressing of the insulating material against the underside 4 and the base of the annular groove guarantees reliable sealing-off against the possibility of, for example, liquid electrolite present in the can housing creeping through the insulating layer 5.

In the exemplary embodiment according to FIG. 2, an axial section through an electrolytic can-type capacitor, which is identical to that according to FIG. 1 with the exception of the design of the flange-like projection, is illustrated. However, in the peg 20 projecting axially downwards, there is no annular groove 16 at the semi-finished stage of the closing disk without an insulating layer 5 applied. In this example also, the elastomer layer is applied in a preproduction stage. After the elastomer layer has been applied, a radial outer layer 22 represented by the broken line is cut off from the peg 20 by attaching a paring ram (not shown) which has an annular radial section. This radially outer layer 22 of the peg 20 is cut off or away in such a manner that, on the one hand, the annular chip 23 forming as a result remains connected relatively firmly and rigidly in material terms to the peg 20 of reduced diameter. On the other hand, the annular chip 23 which forms as a closed ring is bent slightly in the direction of the underside 4 of the closing disk 2 by means of a flange-like radial extension, but also by means of the curve which is conventional in cutting. As a result, the outer edge of the original peg 20 is pressed as a relatively sharp marginal edge 24 onto the radially inner insulating layer 5. The operation of cutting away or paring off, which is carried out, for example, with an original diameter of the peg of 7 mm, to a thickness of 0.5 mm, is usually sufficient to produce a sealing region 28 in the radially innermost region of the insulating layer 5. The cutting curve results at the same time in a kind of undercut, so that pressing of the insulating material against the base 29 of the annular groove 16 is also achieved. In this form also, both an axial seal relative to the underside 4 of the closing disk 2 and a radial seal in the region of the base 29 of the annular groove 16 are obtained. Consequently, the penetration of a liquid electrolyte is usually prevented simply by the marginal edge 24, which conventionally forms an angle of 90°, and because the latter is pressed into the insulating mateiral. In all cases, however, creeping through the insulating layer, with the resulting reforming of the interface of the closing disk 2, is prevented as a result of the press-seals against the underside 4 of the closing disk in the manner of a closed annular gasket which is additionally supplemented by the radial seal of the annular groove.

The fragmentary axial section according to FIG. 3 through a prefabricated closing disk 2 inserted into a can housing 1 is, in principle, a combination of the examples according to FIGS. 1 and 2. Here, the flange-like projection is formed by a larger annular groove 26 in the base region of the peg 20. In addition, here, the annular chip 23 has been cut by means of a cutting operation and pressed down onto the insulating layer 5. In this exemplary embodiment, the radial extension of the original annular groove is supplemented by the additional radial extension of the annular chip 23. As well as this cutting of the annular chip 23, which is conventionally sufficient for material upsetting, further upsetting of material on the peg 20 can also be provided in an axial direction against the surface of the closing disk 2. Consequently, in the above-mentioned examples of the closing disks, creeping and resulting changes in capacitance as result of reforming actions can be prevented by the simplest means and also by means suitable for mass-production.

We claim:

1. A metal closure for closing an electrolytic capacitor having a can housing, said closure comprising a disk with a substantially bar-shaped metal extension of smaller diameter secured at the base thereof to a first surface of the disk and a plastic or elastomeric insulating layer applied at least to said first surface, said insulating layer covering the first surface substantially completely and being applied so as to abut the base of the extension, said extension having at least one flange-like projection, said projection spaced from the first surface approximately the distance amounting to the thickness of the insulating layer, said projection being turned down onto the insulating layer in press-sealing contact against the first surface of the disk when said closure is positioned in the can housing with a portion of the insulating layer extending between the disk and the housing.

2. A closure as claimed in claim 1, wherein the insulating layer substantially fills, at least radially, an annular space formed between the flange-like projection and the first surface of the disk.

3. A closure as claimed in claim 1 or 2, wherein the flange-like projection defines an annular groove merging into the first surface at the base of the extension.

4. A closure as claimed in claim 1 or 2, wherein the flange-like projection comprises an outer annular layer of the extension connected thereto in the base region.

5. A closure as claimed in claim 4, wherein the flange-like annular layer extends essentially radially relative to the axis of the disk and is a closed annulus which is brought down against the insulating layer in the manner of a rivet-closing head.

6. A closure as claimed in claim 4 wherein the flange-like projection is defined by an annular groove merging into the first surface and by a substantially radially extending annular chip.

7. A closure as claimed in claim 1 or 2, wherein the extension is headed forming a press-sealing contact between the projection formed by heading and the insulating layer.

8. A closure as claimed in claim 1 or 2, wherein the extension is bar-shaped and rotationally symmetrical relative to the center axis of the disk.

9. A closure as claimed in claim 1 or 2, wherein the insulating layer is injected-molded or vulcanized on the disk.

10. A closure as claimed in claim 1 or 2 wherein the insulating layer is applied as a pre-fabricated disk-like molding with a central recessed extension.

11. A closure as claimed in claim 10, wherein the central recess of the insulating layer has a somewhat smaller diameter than the smallest outside diameter of the extension.

12. A process for improving the seal between the surface of a metal disk, having a peg-like projection, and an insulating layer applied over a surface of the metal disk forming a closure for closing a can housing of an electrolytic capacitor, said insulating layer comprising a plastic or an elastomeric material abutting the peg-like projection, comprising the steps for turning down a flange-like portion of the projection into press-engagement with the insulating layer in such a way that the insulating layer is pressed down annularly against the surface of the metal disk in a sealing manner when said closure is positioned in the can housing with a portion of the insulating layer extending between the disk and the housing.

13. The process according to claim 12, wherein the flange-like portion of the projection is formed by upsetting the projection.

14. The process according to claim 12, wherein the flange-like portion of the projection is formed by cutting an annulus in the region of the base of the projection.

* * * * *

UNITED STATES PATENT AND TRADEMARK OFFICE
CERTIFICATE OF CORRECTION

PATENT NO. : 4,566,604

DATED : January 28, 1986

INVENTOR(S) : Franz J. Wolf et al.

It is certified that error appears in the above-identified patent and that said Letters Patent is hereby corrected as shown below:

Title page:

In the line listing the Foreign Application Priority Data:
"December 17, 1983" should read —December 17, 1982—.

Column 1 Line 36 "a" should read —at—.

Column 3 Line 31 After "this," delete —s—.

Column 6 Line 1 "EMBODIMENT" should read —PREFERRED EMBODIMENTS—.

Column 7 Line 39 "mateiral" should read —material—.

Signed and Sealed this

Seventeenth Day of June 1986

[SEAL]

Attest:

DONALD J. QUIGG

Attesting Officer

Commissioner of Patents and Trademarks